United States Patent [19]

Jaffe

[11] 4,351,717

[45] Sep. 28, 1982

[54] CATALYST FOR HYDROTREATING RESIDUAL PETROLEUM OIL

[75] Inventor: Stephen B. Jaffe, Cherry Hill, N.J.

[73] Assignee: Mobil Oil Corporation, New York, N.Y.

[21] Appl. No.: 208,956

[22] Filed: Nov. 21, 1980

Related U.S. Application Data

[62] Division of Ser. No. 822,495, Aug. 8, 1977, Pat. No. 4,267,071.

[51] Int. Cl.$^3$ ............................................. C10G 45/08
[52] U.S. Cl. ........................... 208/216 PP; 208/251 H
[58] Field of Search ....................... 208/216 PP, 251 H

[56] References Cited

U.S. PATENT DOCUMENTS

| | | | |
|---|---|---|---|
| 3,383,301 | 5/1968 | Beuther et al. | 208/216 PP |
| 3,785,967 | 1/1974 | Klinken | 208/216 PP |
| 3,891,541 | 6/1975 | Oleck et al. | 208/216 PP |
| 3,898,155 | 8/1975 | Wilson | 208/251 H |
| 3,983,030 | 9/1976 | Rosynek et al. | 208/251 H |
| 4,188,284 | 2/1980 | Quick et al. | 208/251 H |

Primary Examiner—Delbert E. Gantz
Assistant Examiner—Olik Chaudhuri
Attorney, Agent, or Firm—Charles A. Huggett; Michael G. Gilman; Charles J. Speciale

[57] ABSTRACT

A catalyst for hydrotreating residual petroleum oil has a pore size distribution related to the measured size distribution of sulfur, nickel and vanadium containing molecules in the residual oil to be hydrotreated. The size distribution of the sulfur, nickel and vanadium containing molecules in the residual oil is measured by gel permeation chromatography. From this measured size distribution, the catalyst pore size distribution which produces desired demetalization and desulfurization is determined for specified process conditions. A catalyst having the determined pore size distribution is produced by calcining alumina at different temperatures to produce alumina with the determined pore size distribution. The alumina is impregnated with cobalt molybdenum to produce the catalyst which is tailored to produce the desired demetalization and desulfurization of the residual oil to be treated.

9 Claims, 7 Drawing Figures fig. 2 fig. 3 fig. 5 fig. 4 fig. 6 fig. 7

CATALYST FOR HYDROTREATING RESIDUAL PETROLEUM OIL

This is a division of copending application Ser. No. 822,495, filed Aug. 8, 1977, now U.S. Pat. No. 4,267,071.

BACKGROUND OF THE INVENTION

This invention relates to catalysts for hydrotreating residual petroleum oil, to methods of making the catalyst and more particularly to methods of tailoring the pore size distribution of the catalyst to the measured size distribution of sulfur, nickel and vanadium containing molecules in the residual oil to produce desired hydrotreating of the residual oil.

Residual petroleum oil fractions such as those heavy fractions produced by atmospheric and vacuum crude distillation columns, are typically characterized as being undesirable as feedstocks for most refining processes due primarily to their high metals and sulfur content. The presence of high concentrations of metals and sulfur and their compounds precludes the effective use of such residua as chargestocks for cracking, hydrocracking and coking operations as well as limiting the extent to which such residua may be used as fuel oil. Perhaps the single most undesirable characteristic of such feedstocks is the high metals content. Principal metal contaminants are nickel and vanadium.

Sulfur is also undesirable in a process unit chargestock. The sulfur contributes to corrosion of the unit mechanical equipment and creates difficulties in treating products and flue gases. At typical cracking conversion rates, about one half of the sulfur charged to the unit is converted to $H_2S$ gas which must be removed from the light gas product.

Increasingly, residual oil is being upgraded into lighter petroleum products, notably transportation fuels, by hydrotreating the residual oil. This treating of residual oil in the presence of a catalyst and hydrogen to transform it into lighter petroleum products is difficult because of the aforementioned presence of sulfur, nickel and vanadium in the molecules of the residual oil.

Catalysts having different size pores have been used to hydrotreat residual oil. For example, it has been recognized that large pore catalysts remove metals faster than small pore catalysts whereas small pore catalysts remove sulfur faster than large pores.

Two layer catalyst beds have been used to hydrotreat residual oil. For example, U.S. Pat. No. 3,985,643 Milstein describes a hydrotreating process in which two beds are used to treat residual oil.

In the prior art, catalysts having different catalyst pore size distributions have been used. U.S. Pat. Nos. 3,876,523 Rosinski et al and 3,891,541 Oleck et al describe methods for preparing catalysts having specific pore size distributions. Generally, any given catalyst is a compromise if it is used to process all residual oils. While a catalyst having a given pore size distribution may be good for one residual oil, it will not be as effective for other residual oils.

"CONFIGURATIONAL DIFFUSION EFFECTS IN CATALYTIC DEMETALIZATION OF PETROLEUM FEEDSTOCKS" by J. C. Spry, Jr. and W. H. Sawyer, a paper presented at the 68th Annual AICHE meeting, Nov. 16-20, 1975, describes the analysis of residual oils by gel permeation chromatography. This paper also describes a computer model for defining catalyst performance in terms of catalyst properties. The paper concludes that there is an optimum catalyst pore size which is dependent upon the molecular size of the reactant. However, there is no disclosure of tailoring the catalyst pore size distribution to the measured characteristics of the residual oil to be processed.

Accordingly, it is an object of this invention to use different catalysts having different pore size distributions to produce desired hydrotreating of the residual oil having measured characteristics.

SUMMARY OF THE INVENTION

In accordance with this invention a catalyst has a pore size distribution which is tailored to the measured size distribution of sulfur, nickel and vanadium containing molecules in the residual oil to be hydrotreated. The pore size distribution of the catalyst produces desired hydrotreating for specified process conditions.

In accordance with this invention the size distribution, porosity and particle size of the catalyst are determined from a unique relationship between concentration of the sulfur, nickel and vanadium containing molecules in the residual oil during processing, the hydrotreating process conditions, and the measured size distribution of the sulfur, nickel and vanadium containing molecules initially in the residual oil to be processed.

After the determination of the pore size distribution, porosity and particle size of the catalyst, the catalyst is produced by calcining alumina at different temperatures to produce alumina with the determined pore size distribution. The alumina is impregnated to produce the catalyst which is then used for hydrotreating the residual oil.

The foregoing and other objects, features and advantages of the invention will be better understood from the following more detailed description and appended claims.

DESCRIPTION OF A PREFERRED EMBODIMENT

MEASUREMENT OF MOLECULAR SIZE IN RESIDUAL OIL

The first step in the making of a catalyst having a pore size distribution tailored to the particular residual oil being treated is the measurement of the size distribution of the sulfur, nickel and vanadium containing molecules in the residual oil. This step is indicated at 10 in the flow sheet of FIG. 1.

Figure 2:
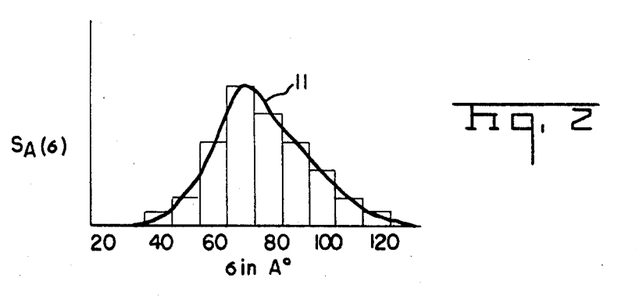
FIG. 2 shows the measured size distribution of sulfur containing molecules in the residual oil.

Following standard procedures the asphaltenes are separated from the maltenes in the residual oil. Maltenes are pentane soluble and asphaltenes are pentane insoluble. Advantage can be taken of this property to make the separation. Then, the size distribution of the sulfur, nickel and vanadium containing molecules in each component is measured by gel permeation chromatography. For example, FIG. 2 depicts the distribution of the sulfur containing molecules in the asphaltenic component as determined by gel permeation chromotography. This example depicts the results of a chromotographic run with cuts at 20, 30, 40 . . . 120 angstroms. The results have been normalized so that the output from each cut is given in terms of the fraction of each size molecule with respect to the total concentration of the component. As shown in FIG. 2, the fraction for each size is as follows:

20A°—0%
30A°—0%
40A°—2½%
50A°—5%
60A°—15%
70A°—25%
80A°—20%
90A°—15%
100A°—10%
110A°—5%
120A°—2½%

The curve 11 represents $S_A(\sigma)$ which is the product of the fractional size distribution of the asphaltenic sulfur containing molecules and the total initial concentration. The production of curves such as this by gel permeation chromatography has become a standard analysis. See for example, FIG. 1 of the aforementioned Spry, Jr. and Sawyer paper.

Figure 3:
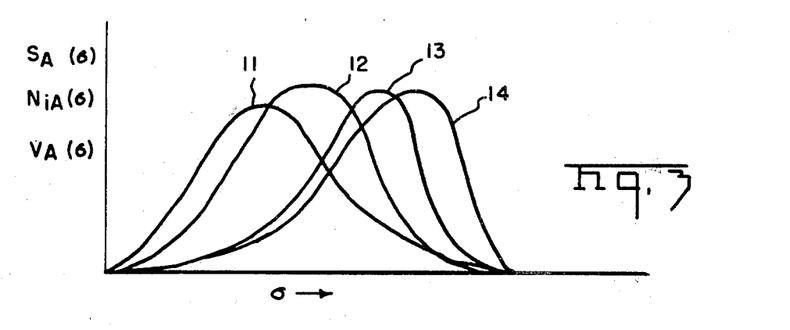
FIG. 3 shows the size distributions of sulfur, nickel and vanadium containing molecules in the residual oil.

In FIG. 3 curve 11 depicts $S_A(\sigma)$, the curve 12 depicts the size distribution of all asphaltenic molecules, the curve 13 depicts $Ni_A(\sigma)$, the size distribution of the nickel containing molecules in the asphaltenic component, and the curve 14 depicts $V_A(\sigma)$, the measured size distribution of vanadium containing molecules in the asphaltenic component. Similar measurements are made for the maltenic component of the residual oil to be processed.

DETERMINATION OF CATALYST PORE SIZE DISTRIBUTION

Figure 1:
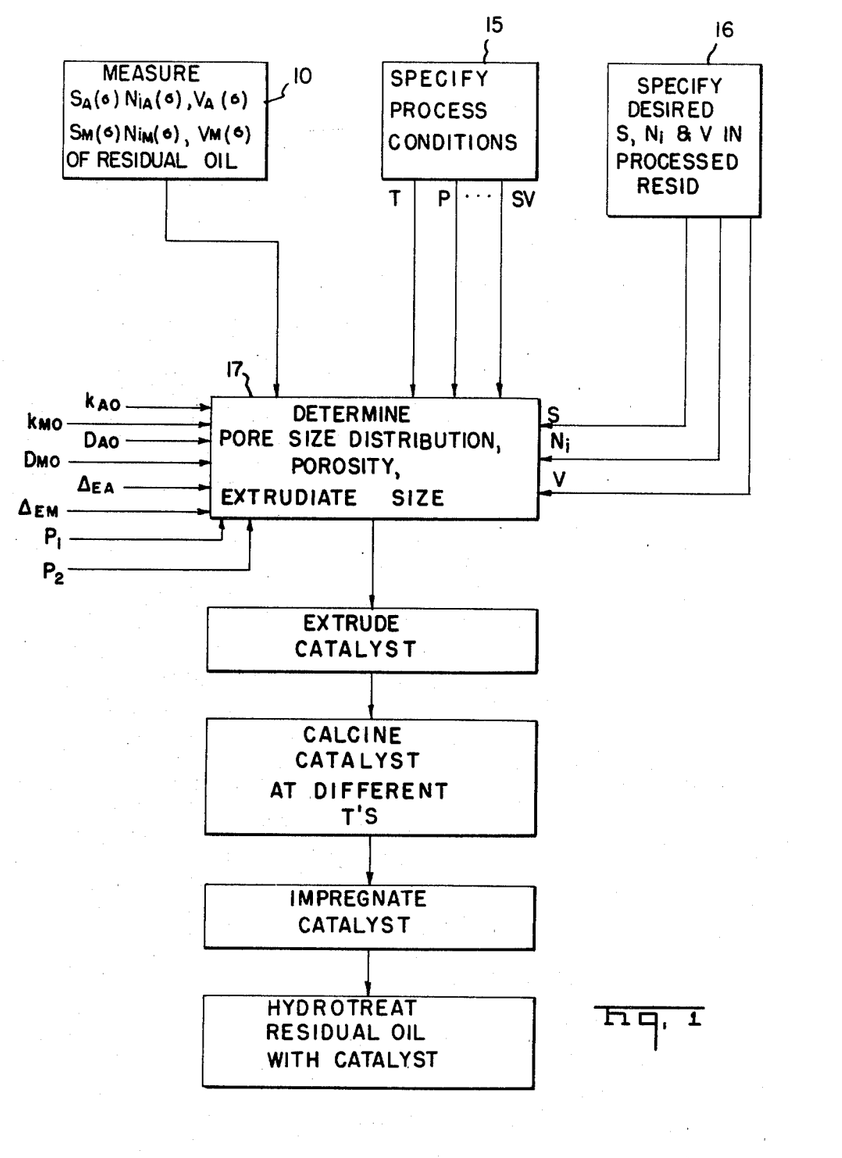
FIG. 1 shows a flow sheet of the process of this invention.

As indicated by the step 15 in FIG. 1 the process conditions under which the residual oil is to be hydrotreated must be specified. Normally, these are set by the particular hydroprocessor to be used. In the particular example under consideration temperature is in the range 650° to 800° F., hydrogen partial pressure is in the range of 1000 to 2000 PSI, and space velocity is in the range 4 to 0.2 l/hrs. Normally, of course, space velocity is maximized.

As indicated by the step 16, the desired demetalization and desulfurization may be specified. For example, it may be specified that the hydrotreating process is to remove all but 10% of the sulfur, nickel and vanadium in the residual oil. In the example under consideration, S, Ni and V are the concentrations of the sulfur, nickel and vanadium respectively remaining after hydrotreating.

When the remaining concentration of S, Ni and V is specified, space velocity is maximized. Alternatively, when space velocity is specified, the minimum remaining concentration of S, Ni and V is obtained.

In accordance with the present invention, the pore size distribution, porosity and extrudate size of the catalyst are tailored to the residual oil to be processed automatically as indicated at 17 in the flow sheet in FIG. 1. The determination is made on automatic computing apparatus such as an IBM 370 computer. The determination is made in the computer in accordance with the following:

$$S = \sum_\sigma S_A(\sigma)e^{-\sum_{d>\sigma} \frac{pkAP\phi \frac{\tanh hA}{hA} \cdot A(d)}{SV}} + \sum_\sigma S_M(\sigma)e^{-\sum_{d>\sigma} \frac{pkMP\phi \frac{\tanh hM}{hM} \cdot A(d)}{SV}} \quad (1)$$

$$Ni = \sum_\sigma Ni_A(\sigma)e^{-\sum_{d>\sigma} \frac{pkAP\phi \frac{\tanh hA}{hA} \cdot A(d)}{SV}} + \sum_\sigma Ni_M(\sigma)e^{-\sum_{d>\sigma} \frac{pkMP\phi \frac{\tanh hM}{hM} \cdot A(d)}{SV}} \quad (2)$$

$$V = \sum_\sigma V_A(\sigma)e^{-\sum_{d>\sigma} \frac{pkAP\phi \frac{\tanh hA}{hA} \cdot A(d)}{SV}} + \sum_\sigma V_M(\sigma)e^{-\sum_{d>\sigma} \frac{pkMP\phi \frac{\tanh hM}{hM} \cdot A(d)}{SV}} \quad (3)$$

S is the concentration of sulfur remaining after hydrotreating,

Ni is the concentration of nickel remaining after hydrotreating,

V is the concentration of vanadium remaining after hydrotreating, $S_A(\sigma)$ is the product of the fractional size distribution of the asphaltenic sulfur containing molecules and the total initial concentration, $S_M(\sigma)$ is the product of the fractional size distribution of the maltenic sulfur containing molecules and the total initial concentration, $Ni_A(\sigma)$ is the product of the fractional size distribution of the asphaltenic nickel containing molecules and the total initial concentration, $Ni_M(\sigma)$ is the product of the fractional size distribution of the maltenic nickel containing molecules and the total initial concentration, $V_A(\sigma)$ is the product of the fractional size distribution of the asphaltenic vanadium containing molecules and the total initial concentration, $V_M(\sigma)$ is the product of the fractional size distribution of the maltenic vanadium containing molecules and the total initial concentration, $\sigma$ is the size of the sulfur, nickel and vanadium containing molecules, d is the pore size, $\rho$ is the packed density of said catalyst, (A)d is the product of the fractional pore size distribution and the total pore area of said catalyst, SV is space velocity, P is the partial pressure of hydrogen in said process, $\phi$ is the stock inhibiting parameter dependent upon the heaviness of the residual oil; it is defined by:

$$\phi = \frac{1}{1 + Pe^{(B1+B2(\frac{4-Arom}{.6})2)}}$$

Arom is wt. fraction of Aromatics in 650+ portion of charge, as defined by silica gel separation, $B_1$ and $B_2$ are adjustable parameters, $$k_A = \tau(1 - \theta)k_{Ao}e^{-\frac{\Delta E_A}{R}(\frac{1}{T} - \frac{1}{1185})}$$

$k_{Ao}$ is the intrinsic asphaltenic rate constant at 725° F.,
$\Delta E_A$ is the intrinsic asphaltenic activation energy,
$\tau$ is the roughness factor and $\theta$ is the catalyst porosity.

$$k_M = \tau(1 - \theta)k_{Mo}e^{-\frac{\Delta E_M}{R}(\frac{1}{T} - \frac{1}{1185})}$$

$k_{Mo}$ is the intrinsic maltenic rate constant at 725° F.,
$\Delta E_M$ is the intrinsic maltenic activation energy, $$h_A = L\sqrt{\frac{4P\theta\tau(1 - \theta)k_{Ao}e^{-\frac{\Delta E_A}{R}(\frac{1}{T} - \frac{1}{1185})}}{d\frac{D_{Ao}}{\sigma}\left(1 - \frac{\sigma}{d}\right)^2}}$$

$h_M$ is similarly defined with parameters for the maltenic component,

T is the temperature,

L is related to the extrudate size by volume of the particle/external surface area of the particle, and $D_{Ao}$ and $D_{Mo}$ are the asphaltenic and maltenic diffusivities in infinitely large pores.

Equations (1)-(3) describe a unique relationship between the measured molecule sizes of the residual oil to be processed, the process conditions, and the catalyst pore size distribution which will produce the desired hydroprocessing. The theoretical basis for the foregoing relationship, and unique aspects of this relationship, will subsequently be described.

This relationship is tailored to produce desired hydroprocessing by adjustable parameters in the relationship. These adjustable relationships are determined experimentally. As an example, the parameters which will produce the desired hydroprocessing for all molybdenum cobalt catalysts are:

$k_{Mo} = 8.26606E-6$
$k_{Ao} = 4.40119E-5$
$D_{Mo} = 1.02208E-4$
$D_{Ao} = 3.57374E-5$
$\Delta E_M = 2.08016E4$
$\Delta E_A = 1.73297E4$
$B_1 = 6.23209E-1$
$B_2 = 3.11764E0$ The foregoing parameters are for the sulfur components. Similar parameters for the Ni and V components can be obtained.

One example of a computer program listing which will carry out the determination follows in standard APL language.

```
        ∇SETUP[□]∇
     ∇  SETUP;R
[1]     R←GAMMA
[2]     RHOB←(1˝EPSILON)×THETA÷VG←THETA÷RHOR×1˝THETA
[3]     D←R[;1]
[4]     SUR←400000000×VG×÷φR
[5]     L←(LENGTH×DIAM÷4)÷LENGTH+DIAM÷2*0.5
     ∇

∇RATE[□]∇
     ∇  RR←RATE;K;H;KEFF;D;SUR;L
[1]     SETUP
[2]     K←(PHI ST)×TAU×(1˝THETA)×KO×*˝ΔE×(÷460+T)˝÷1185
[3]     H←(L÷30)×(((S×⌽(φpS)pK÷(pK)pDO)°.×D)*0.5)÷(˝S)°.+D
[4]     KEFF←(⌽(φpS)p(RHOB÷SV)°.×K)×((7oO [H)÷H)+.×SUR
[5]     RR←+/C650[ST]×SO[ST;]+.×F[ST;;]×*˝KEFF

∇GAMMA[□]∇
     ∇  R←GAMMA;Y
[1]     Y←100×(*5×Y)÷*5

[2]     →S1×ιP≦35

[3]     R←(÷BETA)×*((⊛Y)×P˝1)˝Y+(0.5×⊛o2×P˝1)+((P˝1)×⊛P˝1)˝P˝1

[4]     →S2
[5]     S1:R←(Y*P˝1)×(*˝Y)÷BETA×!P˝1

[6]     S2:R←D,[1.5] R×A D←ALPHA+Y×BETA

[7]     MU←ALPHA+P×BETA

∇PHI[□]∇
     ∇  R←PHI ST
[1]     R←P÷2000+P×(*((0.4˝SIO2[ST]×C650[ST])÷0.6)°.* 0 2)+.×R

∇A[□]∇
```

-continued $$\nabla \quad R \leftarrow \underline{A} \ V$$

[1] $\quad R \leftarrow 0.5 \times (\prime/V[2\ 1]),(^-2\downarrow(2\phi V)\prime V),\prime/\phi^-2\uparrow V$
$\nabla$ Briefly, the operation of this program is as follows. The first two lines of subroutine SETUP determine the catalyst area distribution corresponding to the catalyst volume distribution from GAMMA. SUR is a list of catalyst surface areas corresponding to the list of diameters D. Line 3 of subroutine SETUP calculates the pore length L from the extrudate dimensions. The length L is defined as the volume of the particle divided by the external surface area of the particle. In the particular example being described it is assumed that cylindrical shaped particles are used, but the program can accommodate other particle shapes because of the foregoing definition.

Subroutine GAMMA specifies a catalyst pore size distribution in terms of the mean $\mu$(Mu), variance $\sigma$(SIG) and initial point $\alpha$(ALPHA) of the pore size distribution curve.

Subroutine RATE makes the calculations of S, Ni and V in accordance with expressions (1)–(3) given above. Specifically, line 9 of subroutine RATE makes the calculation of equation 1.

The exemplary program listing given above specifies a looping procedure in which different pore size distributions, (GAMMA) are tried until the lowest sulfur content is achieved. Alternatively, given the sulfur, nickel and vanadium concentrations that are desired, the program loops through different GAMMAS until the highest space velocity is obtained.

Figure 4:
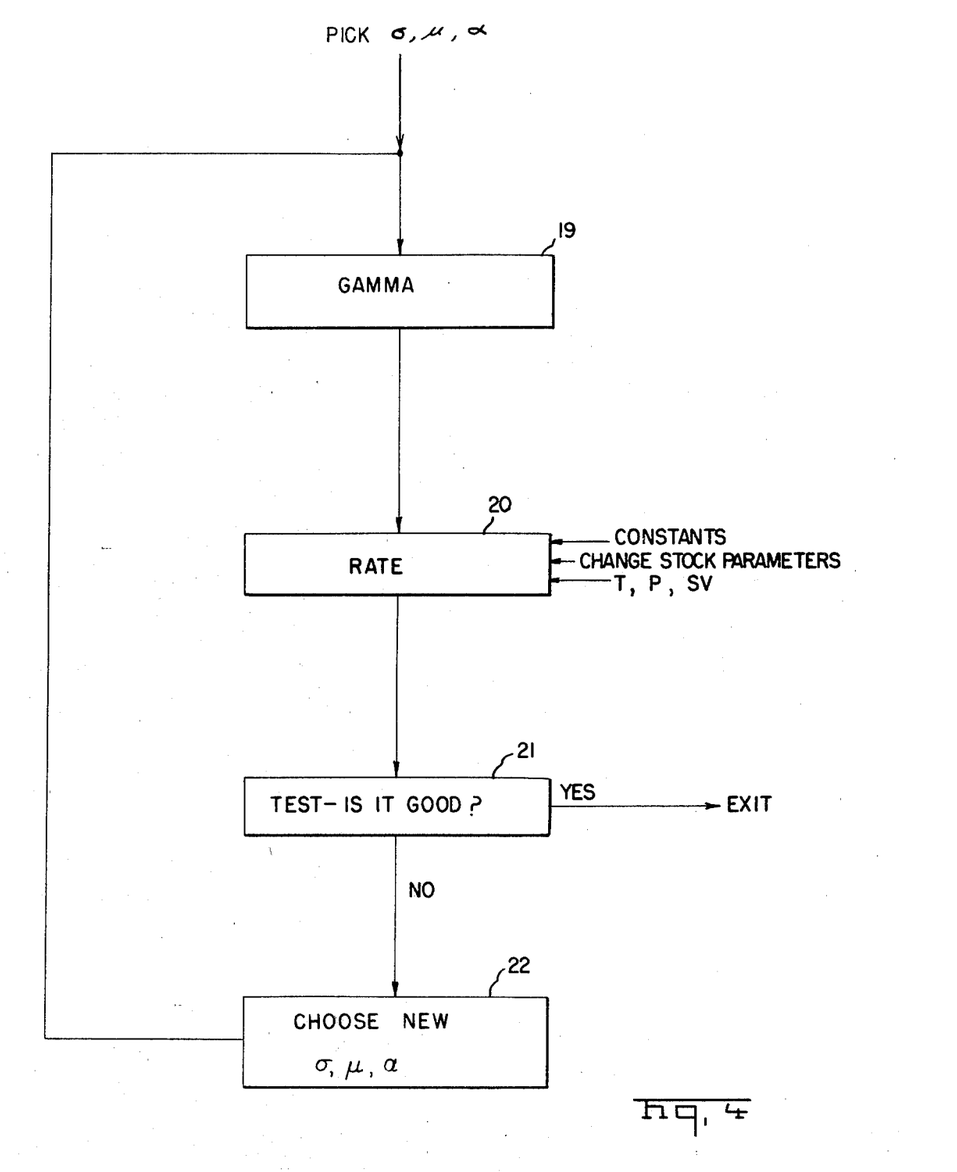
FIG. 4 shows a flow chart of the determination of the catalyst pore size distribution.

This is shown in the flow chart of FIG. 4 wherein initial values of $\alpha$, $\beta$ and $\gamma$ are supplied to subroutine GAMMA which, as indicated by the step 19, specifies a catalyst pore size distribution.

Given this catalyst pore size distribution, subroutine RATE, determines the remaining concentrations of sulfur, nickel and vanadium as indicated by the step 20. As indicated at 21, a test is made to determine whether these remaining concentrations meet the desired requirements. If they do not, new values of $\alpha$, $\beta$ and $\gamma$ are located as indicated at 22. The program goes through another loop. Finally the remaining concentrations meet the desired requirements.

Figure 5:
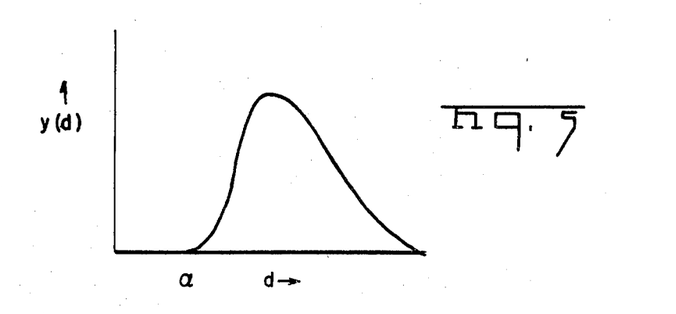
FIG. 5 shows a catalyst pore size distribution curve used in the preparation of the catalyst.

The output is a catalyst pore size distribution as shown in FIG. 5. FIG. 5 gives pore size distribution. In the example being considered, the pore size distribution curve is a GAMMA function which has been normalized so that the area under the curve is one. The abscissa of the curve is catalyst pore diameter(d) and the ordinate is differential volume y(d) where:

$$y(d) = \frac{x^{\lambda-1} e^{-x}}{\beta \Gamma(\lambda)}$$

where $$x = \frac{d - \alpha}{\beta}$$

and $\Gamma(\lambda)$ is the gamma function

The pore size distribution curve of FIG. 5 is used to specify the catalyst which is prepared in the manner to be subsequently explained.

DEVELOPMENT OF THE RELATIONSHIP FROM WHICH PORE SIZE DISTRIBUTION IS DETERMINED

Figure 6:
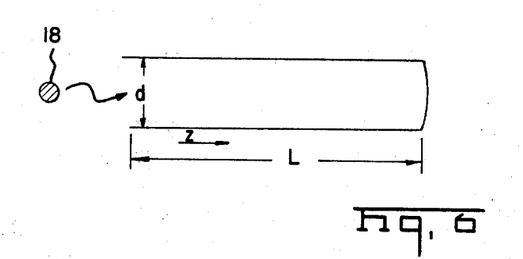
FIG. 6 depicts an idealized catalyst pore.
Figure 7:
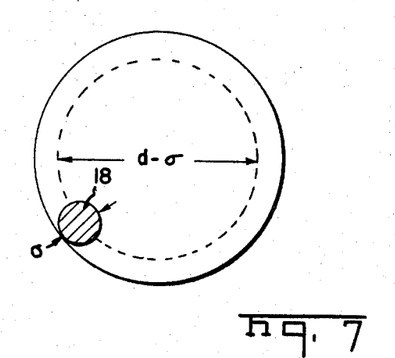
FIG. 7 depicts the cross section of an idealized catalyst pore and a residual oil molecule therein.

The relationships between residual oil molecule size and catalyst pore size distribution are based upon the simplified pore model shown in FIGS. 6 and 7. It is assumed that a pore has a simple cylindrical shape with length L and diameter d. Based on this model, the rate of diffusion of molecules into the pores is equal to the rate of reaction in the pores. This is expressed as:

$$\frac{\pi d^2}{4} D \frac{\partial^2 S}{\partial Z^2} = \pi d k P \phi S$$

where the rate of diffusion of molecules into the pores is on the left-hand side of the above equation and the rate of reaction is given on the right-hand side. The boundary conditions are:

$$S = S_o \qquad \frac{\partial S}{\partial Z} = 0$$

$$Z = 0 \qquad Z = L$$

The solution of the foregoing differential equation is:

$$S = S_o \frac{\cosh h\left(1 - \frac{Z}{L}\right)}{\cosh h}$$

where $$H = L \sqrt{\frac{4kP\phi}{dD}}$$

In the foregoing the diffusivity term D is a restricted diffusivity which is the portion of the cross sectional area of the pore in which molecules are free to move. Referring to FIG. 7, it will be seen that the molecule 18 cannot move freely in the entire cross sectional area of the pore. Rather, it is restricted to the area defined by the difference between the pore diameter and the molecule diameter $d - \sigma$. Therefore, the restricted diffusivity is related to classical diffusivity $D_o$ by $$D = \frac{D_o}{\sigma} \frac{\pi(d - \sigma)^2}{\pi d^2}$$

$$D = \frac{D_o}{\sigma} \left(1 - \frac{\sigma}{d}\right)^2$$

Now consider the reaction of molecules of one size $\sigma_1$ in one pore:

$$\frac{\text{Rate}}{\text{Pore}} = -\int_0^L \pi dk P\phi\, S(\sigma_1)\, dZ$$

Integrating the foregoing equation and gathering the terms $\pi dL$ into one term for the internal surface area of the pore A(d), we get $$= \underbrace{-S(\sigma)\, kP\phi\, \frac{\tanh h}{h}}_{\text{EFFECTIVE } K} \cdot \underbrace{A(d)}_{\text{AREA}}$$

where $-S(\sigma) kP\phi \frac{\tanh h}{h}$ is the EFFECTIVENESS FACTOR.

The reaction in all of the pores of a single pellet can be obtained by summing the foregoing for all pores having a diameter d greater than the diameter of the molecule $\sigma$.

$$\frac{\text{Rate}}{\text{Pellet}} = \sum_d \frac{\text{Rate}}{\text{Pore}} = -S(\sigma_1)\, kP\phi \sum_{d>\sigma_1} \frac{\tanh h}{h} \cdot A(d)$$

In the foregoing, A(d) is given in meters squared per gram. This is converted into the rate per volume of bed to obtain $$\frac{\text{Rate}}{\text{Vol Bed}} = -S(\sigma)\, \rho kP\phi \sum_{d>\sigma_1} \frac{\tanh h}{h} \cdot A(d)$$

Now expressing the reaction of all size molecules we get $$\frac{dS_A}{d\left(\frac{1}{SV}\right)} = \frac{\text{RATE}}{\text{Vol Bed}} =$$

$$-\sum_\sigma S(\sigma)\, \rho kP\phi \sum_{d>\sigma} \frac{\tanh h}{h} \cdot A(d)$$

The foregoing is the expression for the reaction of asphaltenic sulfur. There is a similar expression for maltenic sulfur. Adding these and integrating, we get the expression for the concentration of sulfur for the residual oil.

$$S = \sum_\sigma S_A(\sigma) e^{-\sum_{d>\sigma} \frac{\rho k_A P\phi \frac{\tanh h_A}{h_A} \cdot A(d)}{SV}} +$$

$$\sum_\sigma S_M(\sigma) e^{-\sum_{d>\sigma} \frac{\rho k_M P\phi \frac{\tanh h_M}{h_M} \cdot A(d)}{SV}}$$

This will be recognized as equation 1 which defines the concentration of sulfur in the residual oil. The concentration of nickel and vanadium can similarly be developed.

PREPARATION OF THE CATALYST

The catalyst having the determined pore size distribution is prepared in one of several different ways, as hereinafter described. Contemplated as within the scope of this invention, for example, is a catalyst with the prescribed pore size distribution such as shown in FIG. 5 prepared by blending two or more component catalysts that do not have the determined pore size distribution. The proportions of component catalysts used in preparing the blend are, of course, chosen so that the mixture does have the determined pore size distribution. The blending step may be done at different stages in the catalyst preparation. For example, two different alumina powders may be blended prior to extrusion and impregnation; or, a calcined alumina powder may be blended with an uncalcined alumina powder, extruded, recalcined, and then impregnated. Or, two or more finished catalysts, that is, catalysts which have been pelleted, or extruded, calcined and impregnated, may be blended to form a substantially uniform mixture that has the determined pore size distribution. It will be recognized, of course, that the blending step is a particularly useful technique in tailoring the catalyst to arrive at a very close approximation to the determined pore size distribution. In many instances, however, it will be possible to prepare a single catalyst by impregnating a uniform alumina with an oxide or a sulfide of a Group VIB metal and an iron group metal, this single catalyst having the determined pore size distribution or a satisfactory approximation thereof, in which case of course the blending step may be eliminated. In any case, whether or not a blend is employed, the pore size distribution of the catalyst refers to the pore size distribution as determined with a mercury porosimeter by techniques well known to those skilled in the art.

Aluminas and finished catalysts for use as blending components may be purchased from manufacturers of catalysts and aluminas. For example, Nalco HF-type aluminas are available from the Nalco Chemical Company. These are available with pore volumes varying from about 0.54 cc/gm to about 2.36 cc/gm, and a corresponding average pore diameter within the range of about 72 Å to about 305 Å. Another manufacturer is American Cyanamid Company, which manufactures a variety of alumina supports and catalysts. Continental Oil Company in the United States manufacturers and sells Catapal SB, which is a hydrated alumina of high purity. This alumina on calcination for three hours at 900° F. produces a gamma alumina with a surface area of 250 m²/g and a total pore volume of 0.53 cc/gm. Almost 90% of its pore volume is in pores having a diameter up to 100 Å diameter, with a very large fraction of these pores being in the range of 60 to 80 Å in diameter. The foregoing are given by way of illustration, there being many other materials available on the market.

In addition to use as blending components, any of the materials mentioned in the foregoing paragraph may be modified with respect to pore size distribution by further treatment such as calcination. In general, further calcination at suitable temperatures will serve to shift the pore size distribution in the direction of larger pores. Materials modified by such treatment may acquire the determined pore size distribution, in which case they are used directly as the catalyst for purposes of the present invention. Alternatively, a modified material may be used as a blending component.

As will be recognized by one skilled in the art, the pore size distribution of the impregnated alumina catalyst usually is determined predominantly by the pore size distribution of the alumina support. In general, alumina supports are prepared by calcining one of several hydrated crystalline or amorphous forms of alumina. The phase changes which occur on calcining the different hydrated aluminas and the temperatures characteristic of the transformations are described in a publication titled "Alumina Properties", by Newsome, Heiser, Russel and Stumpf (Alcoa Research Laboratories, 1960), the entire contents of which are incorporated herein by reference. In general, the phases appearing at higher temperatures are characterized by larger pore diameters, but the pore size distribution is also affected by other factors such as the moisture content of an extrudate, for example. Thus, by modification of temperature, time and other variables it is possible to control pore size distribution with considerable effectiveness.

As examples of patents which illustrate the techniques used to prepare a catalyst having a particular pore size distribution, which may or may not be the determined pore size distribution of this invention, the following are noted: U.S. Pat. No. 3,383,301 (Beuther et al.), U.S. Pat. No. 2,890,162 (Anderson), U.S. Pat. No. 3,242,101 (Erickson), and U.S. Pat. No. 3,985,684 (Arey et al). As further examples, U.S. Pat. No. 3,876,523 (Rosinski et al.) describes the preparation of a catalyst having a pore size distribution characterized by over 60% of its pore volume in pores 100–200 Å diameter, and about 10% of its pore volume in pores greater than 500 Å diameter. The preparation of a catalyst based on Catapal SB alumina and having a pore size distribution such that not less than about 55 to 75% of its pore volume is in pores having a diameter range of about 180 to about 300 Å is described in U.S. Pat. No. 3,891,541 (Oleck et al.). Other patents illustrating different catalysts include U.S. Pat. No. 3,785,967 (van Klinken), U.S. Pat. No. 3,712,861 (Rosinski et al) and U.S. Pat. No. 3,393,148 (Bertolacini et al). The entire contents of all of the foregoing patents are incorporated herein by reference.

While a particular embodiment of the invention has been shown and described, various modifications will occur to those skilled in the art. The appended claims are, therefore, intended to cover all such modifications which fall within the true spirit and scope of the invention.

What is claimed is:

1. A process for catalytically demetalizing and desulfurizing a residual oil comprising:
   measuring the size distribution of sulfur, nickel and vanadium containing molecules in said residual oil,
   determining from said measured size distribution the pore size distribution, porosity and extrudate size of a catalyst producing desired demetalation and desulfurization of said residual oil for specified conditions of temperature, pressure and space velocity,
   producing an alumina having deposited thereon an oxide or a sulfide of a Group VI-B metal and an iron group metal thereby forming said catalyst having said determined pore size distribution, and
   contacting said residual oil with hydrogen in the presence of said catalyst at about said specified process conditions whereby inducing said optimum demetalization and desulfurization during said contacting step.

2. The process recited in claim 1 wherein said pore size distribution, porosity, and extrudate size of said catalyst; and said temperature, pressure and space velocity of the hydrotreating process are selected in accordance with:

$$S = \sum_\sigma S_A(\sigma) e^{-\sum_{d>\sigma} \frac{\rho k_A P \phi \frac{\tanh h_A}{h_A} \cdot A(d)}{SV}} + \quad (1)$$

$$\sum_\sigma S_M(\sigma) e^{-\sum_{d>\sigma} \frac{\rho k_M P \phi \frac{\tanh h_M}{h_M} \cdot A(d)}{SV}}$$

$$Ni = \sum_\sigma Ni_A(\sigma) e^{-\sum_{d>\sigma} \frac{\rho k_A P \phi \frac{\tanh h_A}{h_A} \cdot A(d)}{SV}} + \quad (2)$$

$$\sum_\sigma Ni_M(\sigma) e^{-\sum_{d>\sigma} \frac{\rho k_M P \phi \frac{\tanh h_M}{h_M} \cdot A(d)}{SV}}$$

$$V = \sum_\sigma V_A(\sigma) e^{-\sum_{d>\sigma} \frac{\rho k_A P \phi \frac{\tanh h_A}{h_A} \cdot A(d)}{SV}} + \quad (3)$$

$$\sum_\sigma V_M(\sigma) e^{-\sum_{d>\sigma} \frac{\rho k_M P \phi \frac{\tanh h_M}{h_M} \cdot A(d)}{SV}}$$

S is the concentration of sulfur remaining after hydrotreating,
Ni is the concentration of nickel remaining after hydrotreating,
V is the concentration of vanadium remaining after hydrotreating,
$S_A(\sigma)$ is the product of the fractional size distribution of the asphaltenic sulfur containing molecules and the total initial concentration,
$S_M(\sigma)$ is the product of the fractional size distribution of the maltenic sulfur containing molecules and the total initial concentration,
$Ni_A(\sigma)$ is the product of the fractional size distribution of the asphaltenic nickel containing molecules and the total initial concentration,
$Ni_M(\sigma)$ is the product of the fractional size distribution of the maltenic nickel containing molecules and the total initial concentration,
$V_A(\sigma)$ is the product of the fractional size distribution of the asphaltenic vanadium containing molecules and the total initial concentration,
$V_M(\sigma)$ is the product of the fractional size distribution of the maltenic vanadium containing molecules and the total initial concentration,
$\sigma$ is the size of the sulfur, nickel and vanadium containing molecules,
d is said pore size,
$\rho$ is the packed density of said catalyst,
A(d) is the product of the fractional pore size distribution and the total pore area of said catalyst,
SV is space velocity,
P is the partial pressure of hydrogen in said process,
$\phi$ is the stock inhibiting parameter dependent upon the heaviness of the residual oil; it is defined by:

$$\phi = \frac{1}{1 + Pe^{(B1 + B2(\frac{A - Arom}{.6})2)}}$$

Arom is wt. fraction of Aromatics in 650+ portion of charge, as defined by silica gel separation, $B_1$ and $B_2$ are adjustable parameters, $$k_A = \tau(1-\theta)k_{Ao}e^{-\frac{\Delta E_A}{R}(\frac{1}{T}-\frac{1}{1185})} \quad (5)$$

$k_{Ao}$ is the intrinsic asphaltenic rate constant at 725° F.,
$\Delta E_A$ is the intrinsic asphaltenic activation energy,
$\tau$ is the roughness factor and $\phi$ is the catalyst porosity.

$$k_M = \tau(1-\theta)k_{Mo}e^{-\frac{\Delta E_M}{R}(\frac{1}{T}-\frac{1}{1185})} \quad (15)$$

$k_{Mo}$ is the intrinsic maltenic rate constant at 725° F.,
$\Delta E_M$ is the intrinsic maltenic activation energy, $$h_A = L\sqrt{\frac{4P\theta\tau(1-\theta)k_{Ao}e^{-\frac{\Delta E_A}{R}(\frac{1}{T}-\frac{1}{1185})}}{d\frac{D_{Ao}}{\sigma}\left(1-\frac{\sigma}{d}\right)^2}}$$

$h_M$ is similarly defined with parameters for the maltenic component,
T is said temperature,
L is related to said extrudate size by volume of the particle/external surface area of the article,
$D_{Ao}$ and $D_{Mo}$ are the asphaltenic and maltenic diffusivities in infinitely large pores, and
$\phi$ is an adjustable parameter including $B_1$ and $B_2$.

3. The process described in claim 1 or claim 2 wherein said Group VI-B metal and iron group metal deposited on said alumina are molybdenum and cobalt.

4. In the art of purifying residual petroleum oil wherein said oil is demetalized and desulfurized in contact with hydrogen with a porous catalyst comprising alumina having deposited thereon an oxide or a sulfide of a Group VI-B metal and an iron group metal, the improvement comprising:

establishing a desired relation between: (1) pore size distribution, porosity and extrudate size of said catalyst; (2) the size distribution of the sulfur, nickes and vanadium containing molecules in said residual oil; and (3) the temperature, pressure and space velocity of said process, and
controlling at least one of the foregoing parameters in accordance with said relationship.

5. The improvement recited in claim 4 wherein said relationship is given by:

$$S = \sum_\sigma S_A(\sigma)e^{-\sum_{d>\sigma}\frac{pk_AP\phi\frac{\tanh h_A}{h_A}\cdot A(d)}{SV}} + \quad (1)$$

$$\sum_\sigma S_M(\sigma)e^{-\sum_{d>\sigma}\frac{pk_MP\phi\frac{\tanh h_M}{h_M}\cdot A(d)}{SV}}$$

$$Ni = \sum_\sigma Ni_A(\sigma)e^{-\sum_{d>\sigma}\frac{pk_AP\phi\frac{\tanh h_A}{h_A}\cdot A(d)}{SV}} + \quad (2)$$

-continued $$\sum_\sigma Ni_M(\sigma)e^{-\sum_{d>\sigma}\frac{pk_MP\phi\frac{\tanh h_M}{h_M}\cdot A(d)}{SV}}$$

$$V = \sum_\sigma V_A(\sigma)e^{-\sum_{d>\sigma}\frac{pk_AP\phi\frac{\tanh h_A}{h_A}\cdot A(d)}{SV}} + \quad (3)$$

$$\sum_\sigma V_M(\sigma)e^{-\sum_{d>\sigma}\frac{pk_MP\phi\frac{\tanh h_M}{h_M}\cdot A(d)}{SV}}$$

S is the concentration of sulfur remaining after hydrotreating,
Ni is the concentration of nickel remaining after hydrotreating,
V is the concentration of vanadium remaining after hydrotreating,
$S_A(\sigma)$ is the product of the fractional size distribution of the asphaltenic sulfur containing molecules and the total initial concentration,
$S_M(\sigma)$ is the product of the fractional size distribution of the maltenic sulfur containing molecules and the total initial concentration,
$Ni_A(\sigma)$ is the product of the fractional size distribution of the asphaltenic nickel containing molecules and the total initial concentration,
$Ni_M(\sigma)$ is the product of the fractional size distribution of the maltenic nickel containing molecules and the total initial concentration,
$V_A(\sigma)$ is the product of the fractional size distribution of the asphaltenic vanadium containing molecules and the total initial concentration,
$V_M(\sigma)$ is the product of the fractional size distribution of the maltenic vanadium containing molecules and the total initial concentration,
$\sigma$ is the size of the sulfur, nickel and vanadium containing molecules,
d is said pore size,
$\rho$ is the packed density of said catalyst,
A(d) is the product of the fractional pore size distribution and the total pore area of said catalyst,
SV is space velocity,
P is the partial pressure of hydrogen in said process,
$\phi$ is the stock inhibiting parameter dependent upon the heaviness of said residual oil; it is defined by:

$$\phi = \frac{1}{1+Pe^{(B_1+B_2(\frac{.4-Arom}{.6})^2)}}$$

Arom is wt. fraction of Aromatics in 650+ portion of charge, as defined by silica gel separation,
$B_1$ and $B_2$ are adjustable parameters, $$k_A = k_{Ao}\,e^{-\frac{\Delta E_A}{R}\left(\frac{1}{T}-\frac{1}{1185}\right)}$$

$k_{Ao}$ is the intrinsic asphaltenic rate constant as 725° F.,
$\Delta E_A$ is the intrinsic asphaltenic activation energy, $$k_M = k_{Mo}\, e^{-\frac{\Delta E_M}{R}\left(\frac{1}{T} - \frac{1}{1185}\right)}$$

$k_{Mo}$ is the intrinsic maltenic rate constant at 725° F.,
$\Delta E_M$ is the intrinsic maltenic activation energy, $$h_A = L \sqrt{\frac{4\left(k_{Aoe} - \frac{\Delta E_A}{R}\left(\frac{1}{T} - \frac{1}{1185}\right)\right) P\phi}{d\, \frac{D_{Ao}}{\sigma}\left(1 - \frac{\sigma}{d}\right)^2}}$$

$h_m$ is similarly defined with parameters for the maltenic component,
T is said temperature, L is related to said extrudate size by volume of the particle/external surface area of the article, $D_{Ao}$ and $D_{Mo}$ are the asphaltenic and maltenic diffusivities in infinitely large pores, and $\phi$ is an adjustable parameter including $B_1$ and $B_2$.

6. The improvement recited in claim 4 wherein the improvement is a simulation of the operation of said process in accordance with said relationship.

7. The improvement recited in claim 6 wherein said simulation is carried out to specify the temperature, pressure and space velocity of the hydrotreating process.

8. The improvement recited in claim 6 wherein said simulation is carried out in the control of the temperature, pressure and space velocity of the process.

9. The process described in claim 4 or claim 5 or claim 6 or claim 7 or claim 8 wherein said alumina catalyst has molydenum deposited thereon as said Group VI-B metal and cobalt as said iron group metal.

* * * * *

UNITED STATES PATENT AND TRADEMARK OFFICE
CERTIFICATE OF CORRECTION

PATENT NO. : 4,351,717

DATED : September 28, 1982

INVENTOR(S) : Stephen Bruce Jaffe

It is certified that error appears in the above-identified patent and that said Letters Patent is hereby corrected as shown below:

Please change the last three equations of Claim 5, columns 14 and 15 to conform with the last three equations of Claim 2, column 13, the corrected equations should read as follows:

$$k_A = \tau(1-\theta) \, k_{Ao} \, e^{-\frac{\Delta E_A}{R}\left(\frac{1}{T} - \frac{1}{1185}\right)}$$

$$k_M = \tau(1-\theta) \, k_{Mo} \, e^{-\frac{\Delta E_M}{R}\left(\frac{1}{T} - \frac{1}{1185}\right)}$$

$$h_A = L \sqrt{\frac{4 P \theta \tau(1-\theta) \, k_{Ao} \, e^{-\frac{\Delta E_A}{R}\left(\frac{1}{T} - \frac{1}{1185}\right)}}{d \frac{D_{Ao}}{\sigma} \left(1 - \frac{\sigma}{d}\right)^2}}$$

Signed and Sealed this

Twelfth Day of March 1985

[SEAL]

Attest:

DONALD J. QUIGG

*Attesting Officer*       Acting Commissioner of Patents and Trademarks